US009429472B2

(12) United States Patent
Iida et al.

(10) Patent No.: US 9,429,472 B2
(45) Date of Patent: Aug. 30, 2016

(54) ILLUMINATION DEVICE AND REFLECTION CHARACTERISTIC MEASURING DEVICE

(71) Applicant: KONICA MINOLTA, INC., Tokyo (JP)

(72) Inventors: Shinichi Iida, Sakai (JP); Wataru Yamaguchi, Sakai (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/894,821

(22) PCT Filed: May 15, 2014

(86) PCT No.: PCT/JP2014/062962
§ 371 (c)(1),
(2) Date: Nov. 30, 2015

(87) PCT Pub. No.: WO2014/192554
PCT Pub. Date: Dec. 4, 2014

(65) Prior Publication Data
US 2016/0109293 A1    Apr. 21, 2016

(30) Foreign Application Priority Data

May 29, 2013    (JP) ................................ 2013-112846

(51) Int. Cl.
| G01J 3/00 | (2006.01) |
| G01J 3/42 | (2006.01) |
| G01J 3/10 | (2006.01) |
| G01J 3/50 | (2006.01) |
| G01J 1/42 | (2006.01) |
| G01J 3/04 | (2006.01) |

(52) U.S. Cl.
CPC .. *G01J 3/42* (2013.01); *G01J 1/42* (2013.01); *G01J 3/04* (2013.01); *G01J 3/10* (2013.01); *G01J 3/50* (2013.01); *G01J 3/504* (2013.01); *G01J 2003/425* (2013.01)

(58) Field of Classification Search
CPC ................ G01J 3/02; G01J 3/42; G01J 3/28; G01N 21/31; G01N 21/552
USPC .................................................... 356/300–445
See application file for complete search history.

(56) References Cited

U.S. PATENT DOCUMENTS 4,443,695 A * 4/1984 Kitamura ........... G06K 15/1214
                                                              250/205
5,065,036 A    11/1991 Cropper et al.

FOREIGN PATENT DOCUMENTS

| JP | 01-296591 A | 11/1989 |
| JP | 02-201250 A | 8/1990 |
| JP | 05-322658 A | 12/1993 |
| JP | 2002-214126 A | 7/2002 |
| JP | 2004-170325 A | 6/2004 |
| JP | 2009-222607 A | 10/2009 |

OTHER PUBLICATIONS

International Search Report and Written Opinion, from PCT/JP2014/062962 with an international filing date of May 15, 2014, 9 pages, mailed on Aug. 12, 2014, Japanese Patent Office, Japan.

* cited by examiner

*Primary Examiner* — Abdullahi Nur
(74) *Attorney, Agent, or Firm* — Baker & Hostetler LLP

(57) ABSTRACT

An illumination device is provided with a light source, a photodetector, and a support structure. The light source, which emits light, has light distribution in which a reference axis serves as an axis of symmetry or light distribution in which a plane including the reference axis serves as a plane of symmetry. A first light beam in the light is guided to the object to be illuminated. A second light beam in the light is guided to the photodetector. The photodetector detects intensity of the second light beam. The light source and the photodetector are supported by the support structure in positions and postures that allow the first light beam and the second light beam to be guided in an aforementioned manner. A traveling direction of the first light beam and a traveling direction of the second light beam make the same angle with the reference axis.

14 Claims, 13 Drawing Sheets

ILLUMINATION DEVICE AND REFLECTION CHARACTERISTIC MEASURING DEVICE

CROSS-REFERENCE TO RELATED APPLICATIONS

This application is a national stage of international application no. PCT/JP2014/062962, filed May 15, 2014, which claims the benefit of Japanese application number 2013-112846, filed May 29, 2013, the disclosures of which are incorporated herein by reference in their entirety.

TECHNICAL FIELD

The present invention relates to an illumination device and a reflection characteristic measuring device.

BACKGROUND ART

Measurement results of measuring devices that illuminate samples, and measure reflection light, transmitted light, and the like from the samples are affected by intensity of illumination light. Therefore, it is required to monitor the intensity of the illumination light in the measuring devices.

For example, in the technology of Patent Literature 1, a light beam emitted from a light source (LED) in a normal line direction is guided to the sample, and becomes the illumination light, and a light beam emitted from the light source in a non-normal line is guided to a photodetector (light-receiving sensor). The intensity of the light beam guided to the photodetector is detected by the photodetector. A detection result of the photodetector is used for correction of a measurement result.

CITATION LIST

Patent Literature

Patent Literature 1: JP 2002-214126 A

SUMMARY OF INVENTION

Technical Problem

However, in the technology of Patent Literature 1, the intensity of the light beam guided to the photodetector may not be temporally changed similarly to the intensity of the light beam guided to the sample, and the detection result of the photodetector may not serve as an index that appropriately reflects the intensity of the light beam guided to the sample. In such a case, the measurement result is not appropriately corrected.

The present invention is made to solve the problem. An object of the present invention is to provide an illumination device form which an index that appropriately reflect the intensity of a light beam guided to an object to be illuminated can be obtained. Further, an object of the present invention is to provide a reflection characteristic measuring device that correctly performs spectrometry.

Solution to Problem

According to a desirable form, an illumination device includes a light source, a photodetector, and a support structure. The light source emits light. The light source has light distribution in which a reference axis serves as an axis of symmetry or light distribution in which a plane including a reference axis serves as a plane of symmetry. A first light beam included in the light is guided to an object to be illuminated. A second light beam included in the light is guided to the photodetector. The photodetector detects intensity of the second light beam. The light source and the photodetector are supported by the support structure in positions and postures that allow the first light beam and the second light beam to be guided in an aforementioned manner. A traveling direction of the first light beam makes a first angle with the reference axis. A traveling direction of the second light beam makes a second angle with the reference axis. The second angle is the same as the first angle.

According to a desirable form, a reflection characteristic measuring device includes the above-described illumination device, a spectrometry mechanism, and a correction unit. The spectrometry device performs spectrometry of reflection light from an object to be illuminated. A correction unit corrects a measurement result of the spectrometry mechanism, using a detection result of the photodetector. In this correction, correction to resolve temporal change of the intensity of the first light beam is performed.

The objects, characteristics, aspects, and advantages of the invention, and objects, characteristics, aspects, and advantages other than the aforementioned points of the present invention will become apparent by detailed description of the present invention below when considered together with the appended drawings.

DESCRIPTION OF EMBODIMENTS

First Embodiment

A first embodiment relates to an illumination device.

Figure 1:
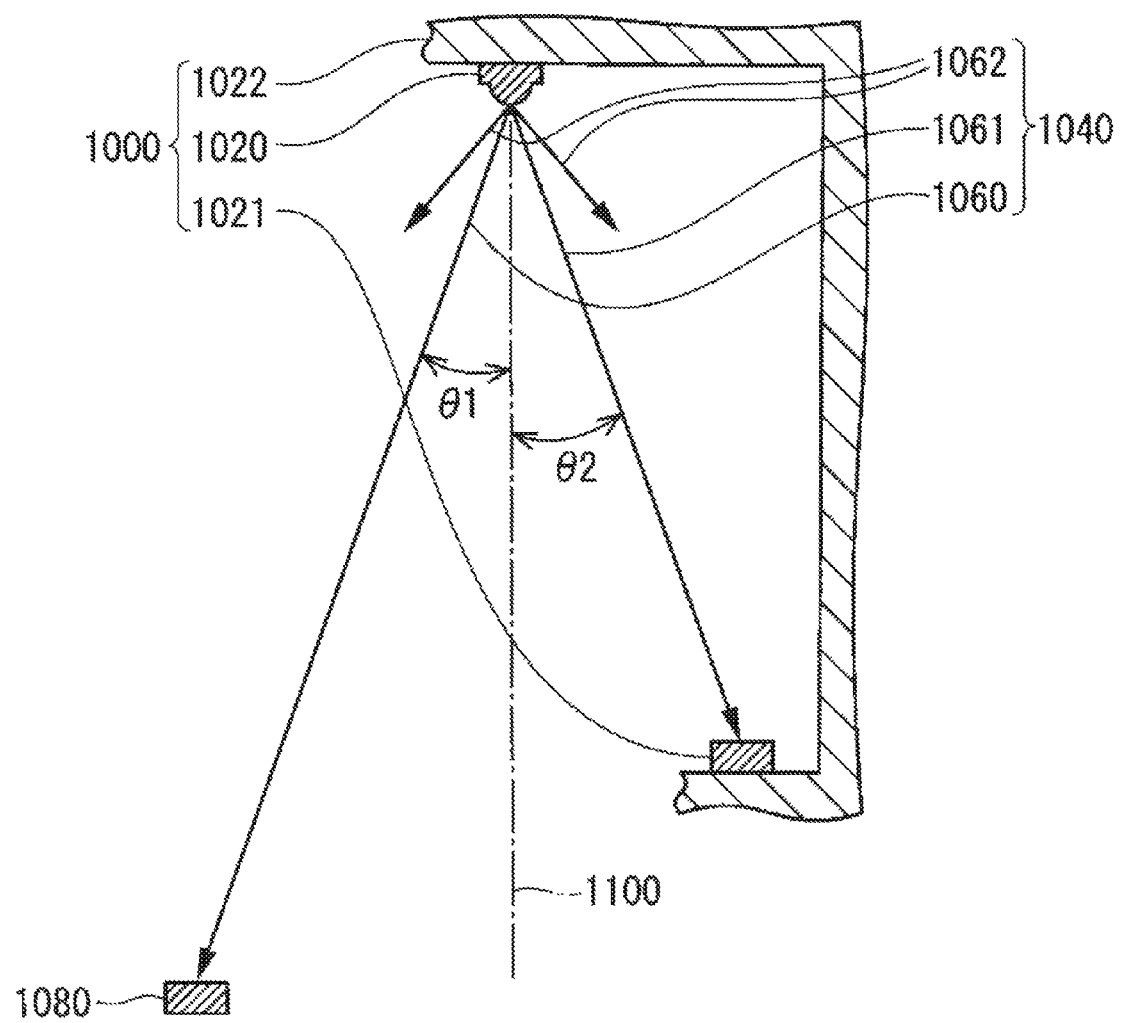
FIG. 1 is a sectional view of an illumination device of a first embodiment.

The sectional view of FIG. 1 schematically illustrates an illumination device 1000 of the first embodiment. The top view of FIG. 2 schematically illustrates an arrangement of a light-emitting diode 1020, a photodiode 1021, and an object to be illuminated 1080.

Figure 2:
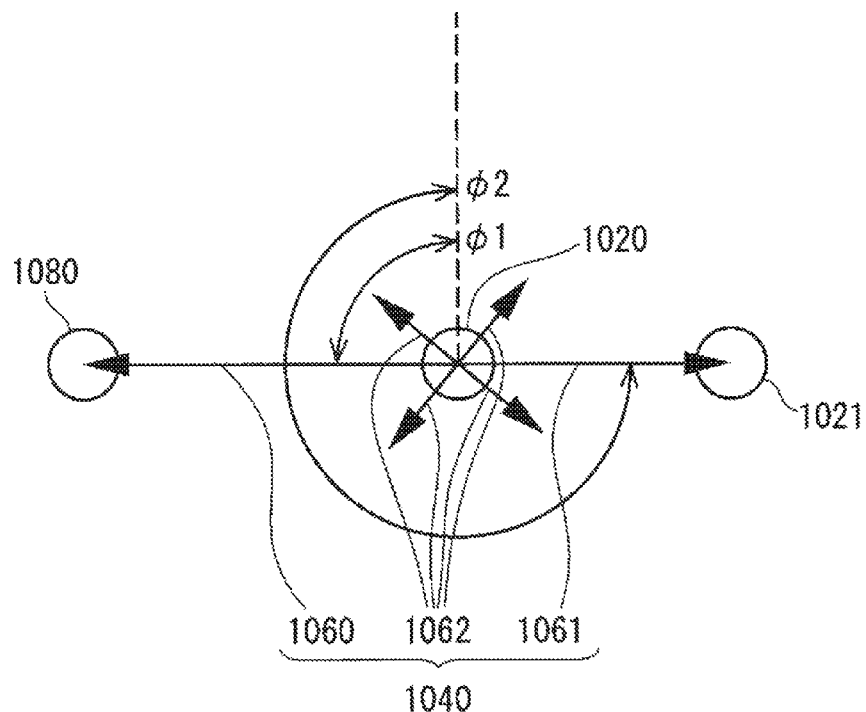
FIG. 2 is a top view of an arrangement of a light-emitting diode and the like in the first embodiment.

As illustrated in FIGS. 1 and 2, the illumination device 1000 includes the light-emitting diode 1020, the photodiode 1021 and a support structure 1022.

The light-emitting diode 1020 emits light 1040.

The light 1040 is formed of a first light beam 1060, a second light beam 1061, and a residual light beam 1062. The first light beam 1060 is directly guided to the object to be illuminated 1080, and becomes illumination light. The second light beam 1061 is directly guided to the photodiode 1021.

A zenith angle θ2 in a traveling direction of the second light beam 1061 is the same as a zenith angle θ1 of a traveling direction of the first light beam 1060. An azimuth angle ϕ2 of the traveling direction of the second light beam 1061 is different from an azimuth angle ϕ1 of the traveling direction of the first light beam 1060. The zenith angles θ1 and θ2 indicate angles made with a reference axis 1100. The azimuth angles ϕ1 and ϕ2 indicate rotation angles around the reference axis 1100.

A spread angle of the first light beam 1060 is set to be small both in a zenith angle direction and an azimuth angle direction, and is desirably set to 2° or less. When the spread angle of the first light beam 1060 is set to be small, variation of an incident angle of a plane to be illuminated of the object to be illuminated 1080 becomes small. Note that the spread angle of the first light beam 1060 may be set larger both or one of in the zenith angle direction and the azimuth angle direction. A spread angle of the second light beam 1061 is set to the same as the spread angle of the first light beam 1060 in the zenith angle direction. The spread angle of the second light beam 1061 may be set to be larger or smaller than the spread angle of the first light beam 1060 in the azimuth angle direction, or may be set to the same as the spread angle of the first light beam 1060.

The light-emitting diode 1020 may be replaced with another type of light source. For example, the light-emitting diode 1020 may be replaced with a halogen lamp, Xenon lamp, or the like.

The photodiode 1021 detects intensity of the second light beam 1061, and output an electrical signal according to the intensity of the second light beam 1061.

The zenith angle θ2 is the same as the zenith angle θ1. Therefore, the intensity of the second light beam 1061 is temporally changed similarly to intensity of the first light beam 1060. From the photodiode 1021, an index that appropriately reflects the intensity of the first light beam 1060 guided to the object to be illuminated 1080 can be obtained.

Figure 3:
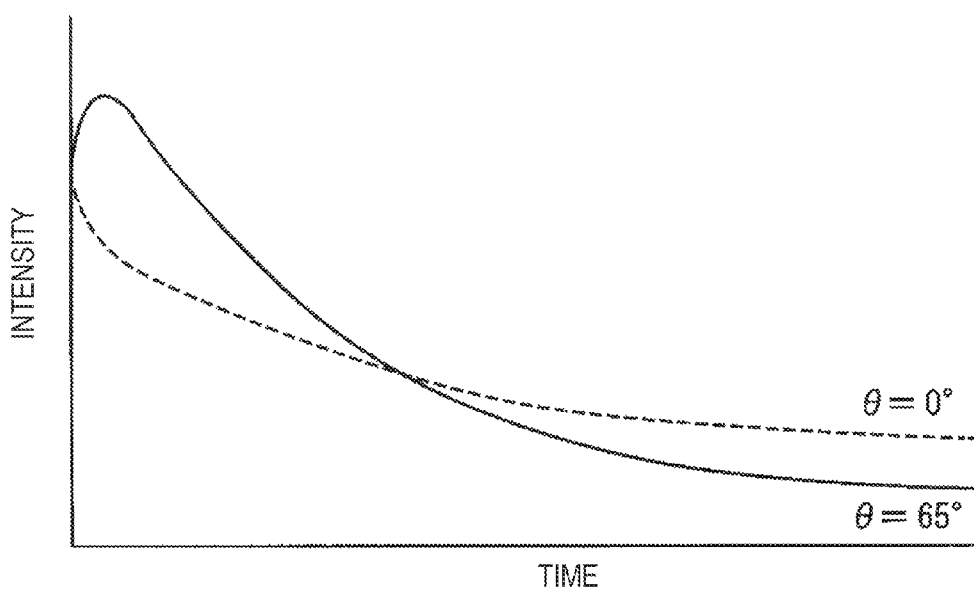
FIG. 3 is a graph illustrating temporal change of intensity of light beams.

In contrast, when the zenith angle θ2 is different from the zenith angle θ1, the intensity of the second light beam 1061 is not temporally changed similarly to the intensity of the first light beam 1060. For example, the zenith angle θ1 is 0° and the zenith angle θ2 is 65°, while the intensity of the first light beam 1060 is monotonously decreased, the intensity of the second light beam 1061 is increased once then sharply decreased to become lower than the intensity of the first light beam 1060, as illustrated in the graph of FIG. 3 that illustrates the temporal change o the intensity of the light beams. FIG. 3 illustrates the temporal change of the intensity of the light beams from when the light-emitting diode 1020 is lighted to when a time of about 0.1 seconds elapses.

The photodiode 1021 may be replaced with another type of photodetector. For example, the photodiode 1021 may be replaced with a photoresistor, a photomultiplier, or the like.

The first light beam 1060 is guided to the object to be illuminated 1080, and becomes the illumination light. The second light beam 1061 is guided to the photodiode 1021.

The support structure 1022 supports the light-emitting diode 1020 and the photodiode 1021 in positions and postures that allow the first light beam 1060 and the second light beam 1061 to be guided in an aforementioned manner.

The illumination device 1000 may include a structure other than the aforementioned structures. For example, an optical system that converges, radiates, reflects, or refracts both or one of the first light beam 1060 and the second light beam 1061 may be provided. The optical system includes a lens, a prism, a mirror, an optical fiber, and the like. When the residual light beam 1062 becomes stray light and affects illumination to the object to be illuminated 1080 or detection of the intensity of the second light beam 1061 with the photodiode 1021, a shield that shields the residual light beam 1062 is desirably provided.

Figure 4:
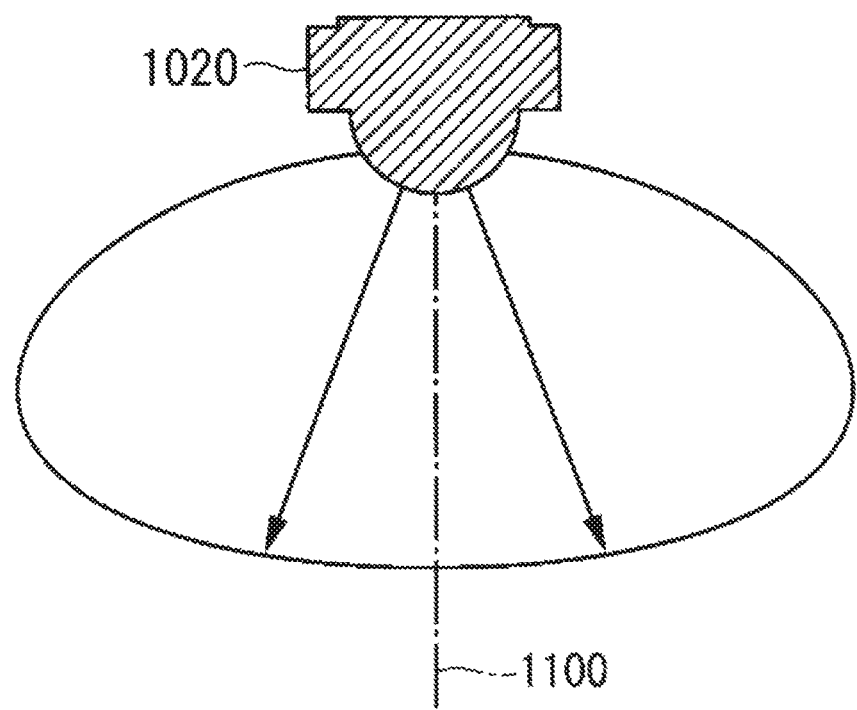
FIG. 4 is a sectional view illustrating light distribution of a light-emitting diode.

The sectional view of FIG. 4 schematically illustrates light distribution of the light-emitting diode 1020.

The light distribution of the light-emitting diode 1020 is axially symmetrical light distribution (rotationally symmetrical light distribution). The light distribution of the light-emitting diode 1020 may be symmetrical light distribution other than the axially symmetrical light distribution. For example, the light distribution of the light-emitting diode 1020 may be light distribution symmetrical about two planes, light distribution symmetrical about one plane, or the like.

The axially symmetrical light distribution is light distribution that can be expressed by rotation of a polar coordinate light distribution curve in a plane that includes an axis of rotation around the axis of rotation, as described in the Japanese Industrial Standards (JIS) Z8113. When the light distribution of the light-emitting diode 1020 is the axially symmetrical light distribution, the reference axis 1100 serves as the axis of rotation. When the light distribution of the light-emitting diode 1020 is the axially symmetrical light distribution, the azimuth angles ϕ1 and ϕ2 may be set in any manner possible.

The symmetrical light distribution is light distribution having one axis of symmetry or at least one plane of symmetry, as described in JIS Z8113. When the light distribution of the light-emitting diode 1020 is the symmetrical light distribution, the reference axis 1100 serves as the axis of symmetry, or a plane including the reference axis 1100 serves as the plane of symmetry. When the light distribution of the light-emitting diode 1020 is the symmetrical light distribution, the azimuth angles ϕ1 and ϕ2 are desirably set such that the traveling direction of the first light beam 1060 and the traveling direction of the second light beam 1061 become symmetrical about the axis of symmetry or the plane of symmetry.

The light distribution symmetrical about two planes is light distribution that includes the reference axis, and is considered symmetrical about mutually perpendicular two planes and are not rotationally symmetrical, as described in JIS Z8113. When the light distribution of the light-emitting diode 1020 is the light distribution symmetrical about two planes, the azimuth angles ϕ1 and ϕ2 are desirably set such that the traveling direction of the first light beam 1060 and the traveling direction of the second light beam 1061 become symmetrical about the two planes.

The light distribution symmetrical about one plane is light distribution that is considered symmetrical about one plane including the reference axis, and is not rotationally symmetrical and not symmetrical about two planes, as described in JIS Z8113. When the light distribution of the light-emitting diode 1020 is the light distribution symmetrical about one plane, the azimuth angles ϕ1 and ϕ2 are desirably set such that the traveling direction of the first light beam 1060 and the traveling direction of the second light beam 1061 become symmetrical about the one plane.

More typically, the light-emitting diode 1020 has light distribution in which the reference axis 1100 serves as the axis of symmetry or light distribution in which a plane including the reference axis 1100 serves as the plane of symmetry.

Second Embodiment

A second embodiment relates to an illumination device.

Figure 5:
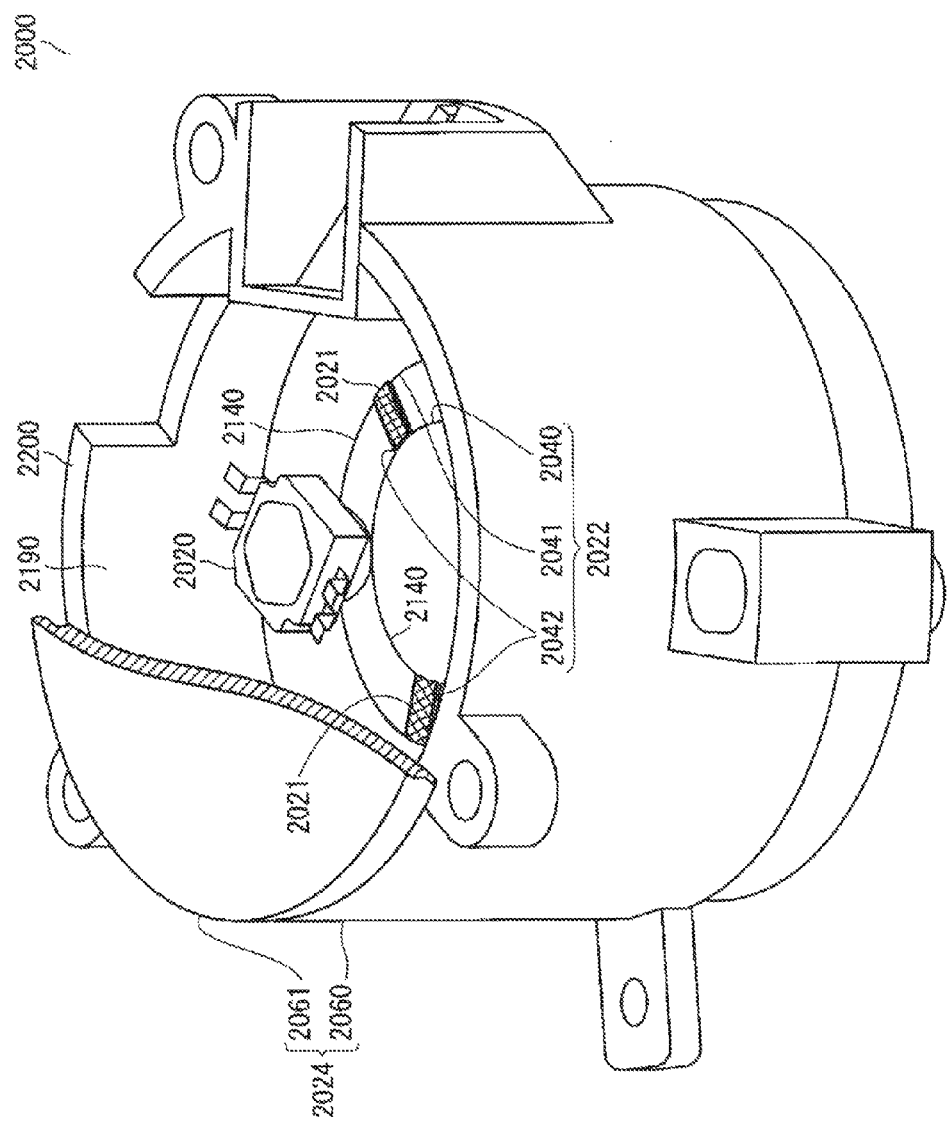
FIG. 5 is a perspective view of an illumination device of a second embodiment.
Figure 6:
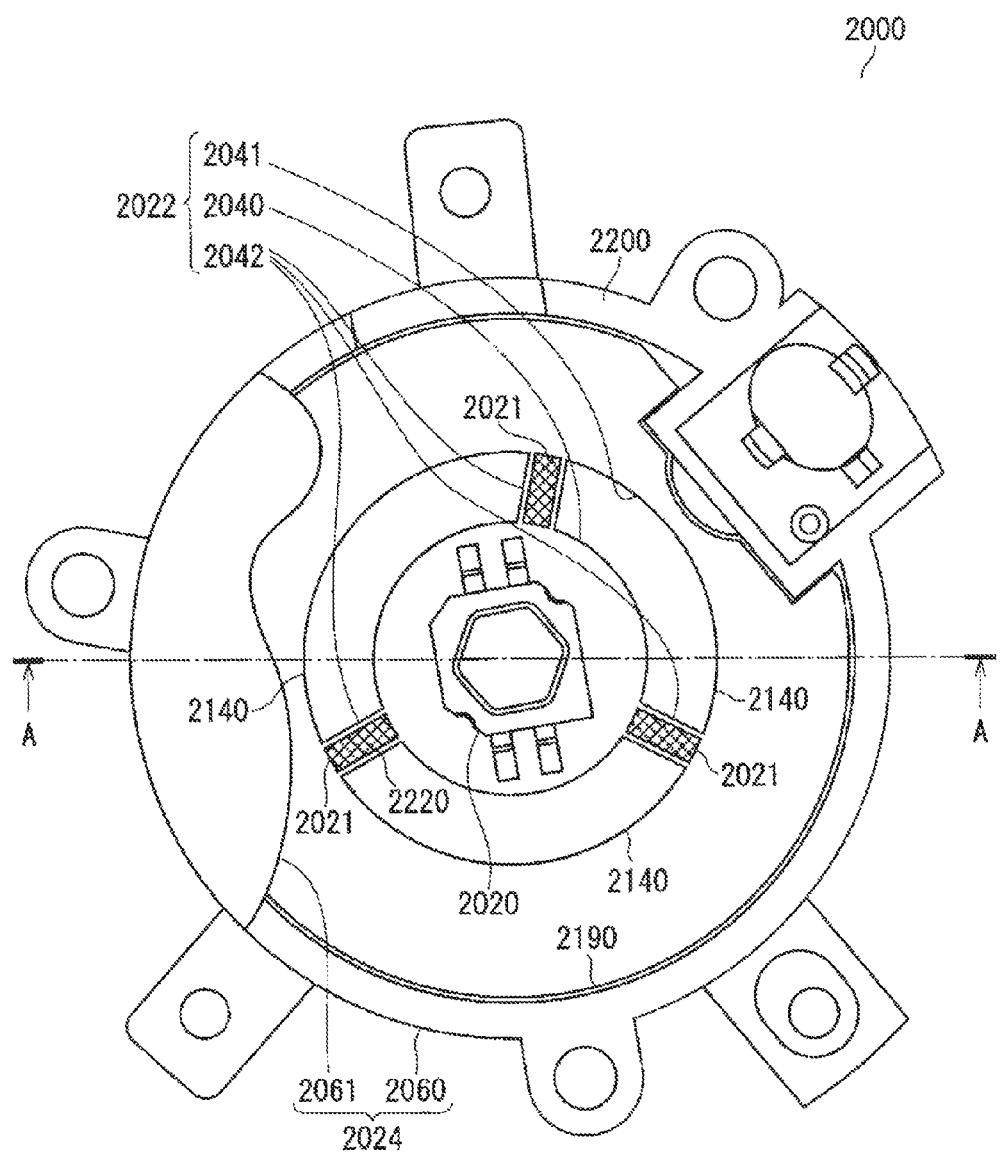
FIG. 6 is a top view of the illumination device of the second embodiment.
Figure 7:
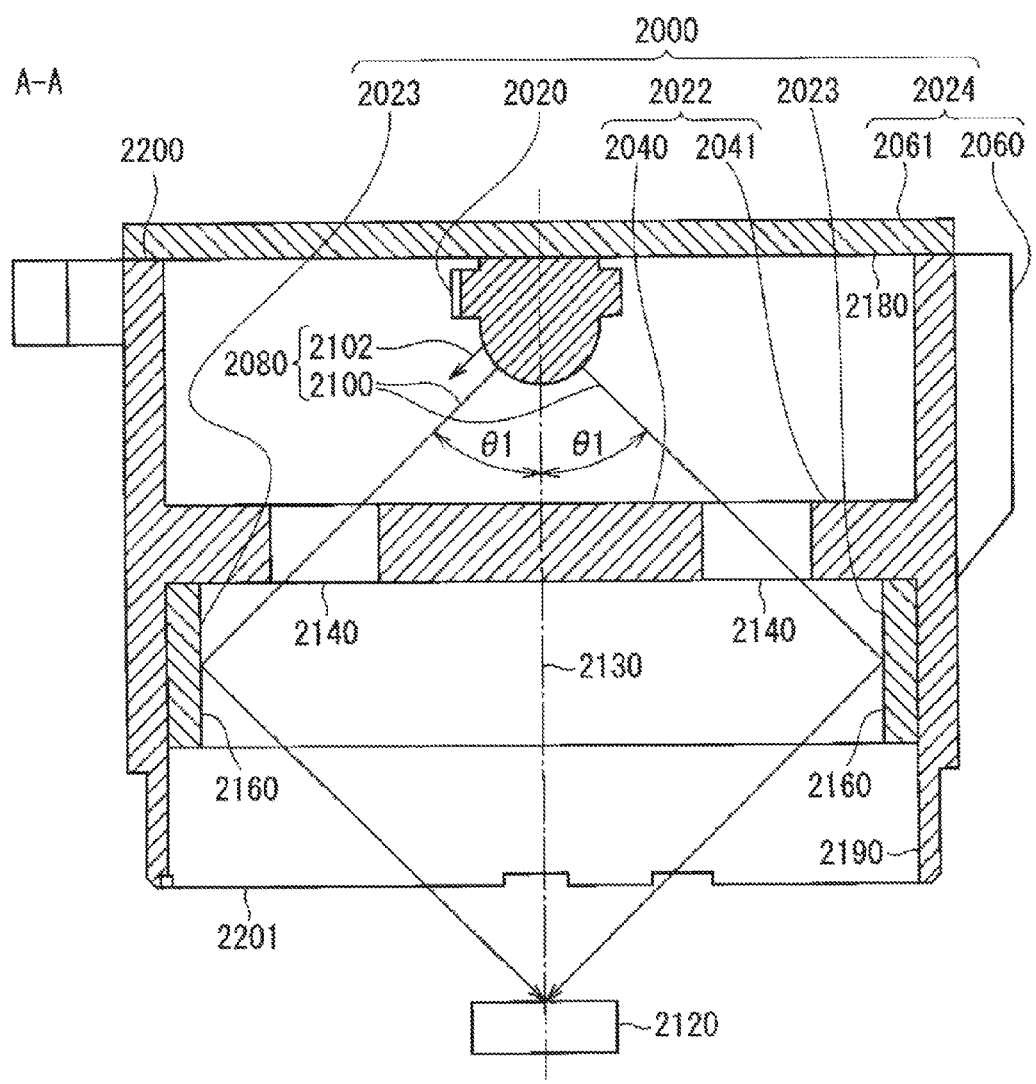
FIG. 7 is a sectional view of the illumination device of the second embodiment.
Figure 8:
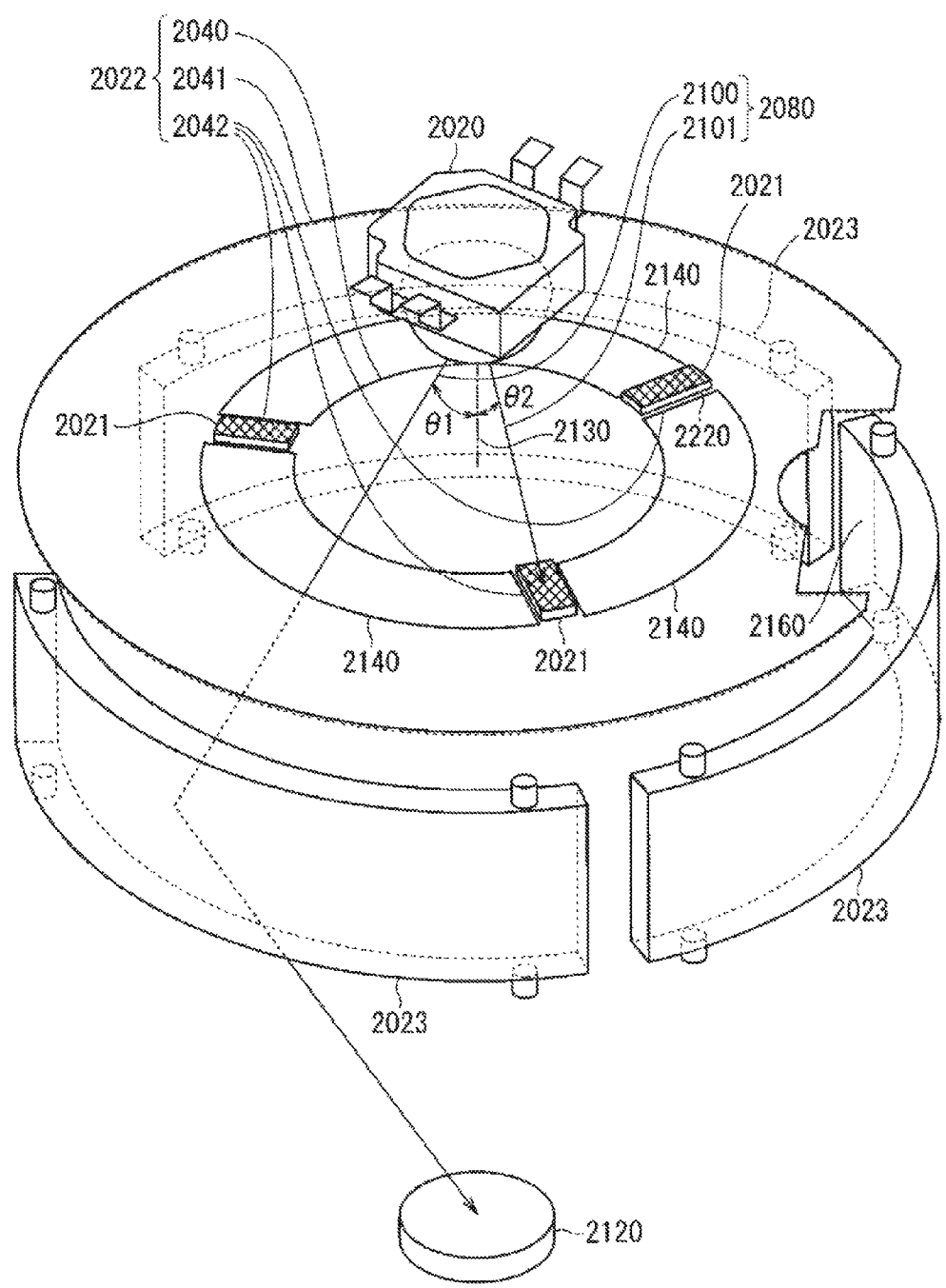
FIG. 8 is a perspective view illustrating an arrangement of a light-emitting diode and the like in the second embodiment.

The perspective view of FIG. 5, the top view of FIG. 6, and the sectional view of FIG. 7 schematically illustrate an illumination device 2000 of the second embodiment. The perspective view of FIG. 8 schematically illustrates an arrangement of a light-emitting diode 2020, photodiodes 2021, a shielding plate 2022, cylindrical mirrors 2023, and an object to be illuminated 2120.

As illustrated in FIGS. 5 to 8, the illumination device 2000 includes the light-emitting diode 2020, the photodiodes 2021, the shielding plate 2022, the cylindrical mirrors 2023, and a housing 2024. The shielding plate 2022 includes an inner circumferential-side plate 2040, an outer circumferential-side plate 2041, and communication pieces 2042. The housing 2024 includes a cylindrical object 2060 and a lid object 2061. The illumination device 2000 may include a structure other than these structures. The illumination device 2000 can be employed as a reflection characteristic measuring device that meets a standard of so-called 45°:0° geometry, in which illumination light illuminates a sample surface, the illumination light being incident on the sample surface from a direction making 45° with a reference axis (normal line) that passes through a center of the sample surface, and reflection light emitted from the sample surface to a direction making 0° with the reference axis is received.

The light-emitting diode 2020 emits light 2080. Light distribution of the light-emitting diode 2020 is the same as the light distribution of the light-emitting diode 1020 of the first embodiment.

The light 2080 is formed of a first light beam 2100, a second light beam 2101, and a residual light beam 2102. The first light beam 2100 is guided to an object to be illuminated 2120, and becomes the illumination light. The second light beam 2101 is guided to the photodiodes 2021. The residual light beam 2102 is shielded by the shielding plate 2022 and the like. A zenith angle $\theta 2$ of a traveling direction of the second light beam 2101 is the same as a zenith angle $\theta 1$ of a traveling direction of the first light beam 2100. An azimuth angle $\phi 2$ of the traveling direction of the second light beam 2101 is different from an azimuth angle $\phi 1$ of the traveling direction of the first light beam 2100.

The illumination device 2000 is a ring illumination device. Therefore, a spread angle of the first light beam 2100 is set to be small in a zenith angle direction, and is desirably set to 2° or less. When the spread angle of the first light beam 2100 is set to be small in the zenith angle direction, variation of an incident angle at which a light beam is actually incident becomes small with respect to an incident angle determined in a standard. The spread angle of the first light beam 2100 is set to be large in an azimuth angle direction. A spread angle of the second light beam 2101 is set to be the same as the spread angle of the first light beam 2100 in the zenith angle direction. The spread angle of the second light beam 2101 may be set to be larger than or the same as the spread angle of the first light beam 2100 in the azimuth angle direction. However, the spread angle of the second light beam 2101 is desirably set to be smaller than the spread angle of the first light beam 2100 in the azimuth angle direction. When the spread angle of the second light beam 2101 is set to be small in the azimuth angle direction and the spread angle of the first light beam 2100 is set to be large in the azimuth angle direction, a lot of light is incident on a plane to be illuminated.

The light-emitting diode 2020 may be replaced with another type of light source. For example, the light-emitting diode 2020 may be replaced with a halogen lamp, a Xenon lamp, or the like.

Each of the photodiodes 2021 detects intensity of the second light beam 2101, and outputs an electrical signal according to the intensity of the second light beam 2101.

The zenith angle $\theta 2$ is the same as the zenith angle $\theta 1$. Therefore, the intensity of the second light beam 2101 is temporally changed, similarly to intensity of the first light beam 2100. From the photodiodes 2021, an index that appropriately reflects the intensity of the first light beam 2100 guided to the object to be illuminated 2120 can be obtained.

The photodiodes 2021 may be replaced with another type of photodetector. For example, the photodiodes 2021 may be replaced with photoresistors, photomultipliers, or the like. The number of the photodiodes 2021 may be increased or decreased.

Annular slits 2140 are formed in the shielding plate 2022. Each of the annular slits 2140 is a hole extending along a circumference of a circle having a center on the reference axis 2130, and the hole having a longer length than a width. The width is a size in a radial direction of the circle. The length is a size in a circumferential direction of the circle. The annular slits 2140 may be replaced with holes having a shape that is difficult to be called "annular slit". For example, the annular slits 2140 may be replaced with a group of a large number of circular holes arrayed in the circumferential direction of the circle.

The inner circumferential-side plate 2040 exists at an inner circumferential side of the annular slits 2140. The outer circumferential-side plate 2041 exists at an outer circumferential side of the annular slits 2140. The communication pieces 2042 communicate the inner circumferential-side plate 2040 and the outer circumferential-side plate 2041. The inner circumferential-side plate 2040 and the outer circumferential-side plate 2041 become an integrated object by the communication pieces 2042, and the shielding plate 2022 can be easily supported. The shielding plate 2022 may be replaced with a shield having a shape that is difficult to be called "shielding plate".

The annular slits 2140 and the communication pieces 2042 are alternately arrayed in the circumferential direction of the circle. The number of the annular slits 2140 may be increased/decreased. When the number of the annular slits 2140 is increased/decreased, the number of the communication pieces 2042 is increased/decreased in accordance with the number of the annular slits 2140.

Stray light is less likely to be guided to the object to be illuminated 2120 by the shielding plate 2022. An index that appropriately reflects the intensity of the light beam guided to the object to be illuminated 2120 can be obtained from the photodiodes 2021.

Each of the cylindrical mirrors 2023 includes an inner circumferential reflection surface 2160. Each of the inner circumferential reflection surfaces 2160 extends along a cylindrical surface of a cylinder including a cylindrical axis on the reference axis 2130.

All or a part of the cylindrical mirrors 2023 may be replaced with another type of optical system. For example, all or a part of the cylindrical mirrors 2023 may be replaced with a prism. The cylindrical mirrors 2023 may be replaced with a reflection mechanism including a plurality of plane reflection surfaces. The reflection mechanism may be a plurality of plane reflection mirrors, each reflection mirror including one plane reflection surface, or may be a polyhedral mirror including a plurality of continuing plane reflection surface.

Figure 9:
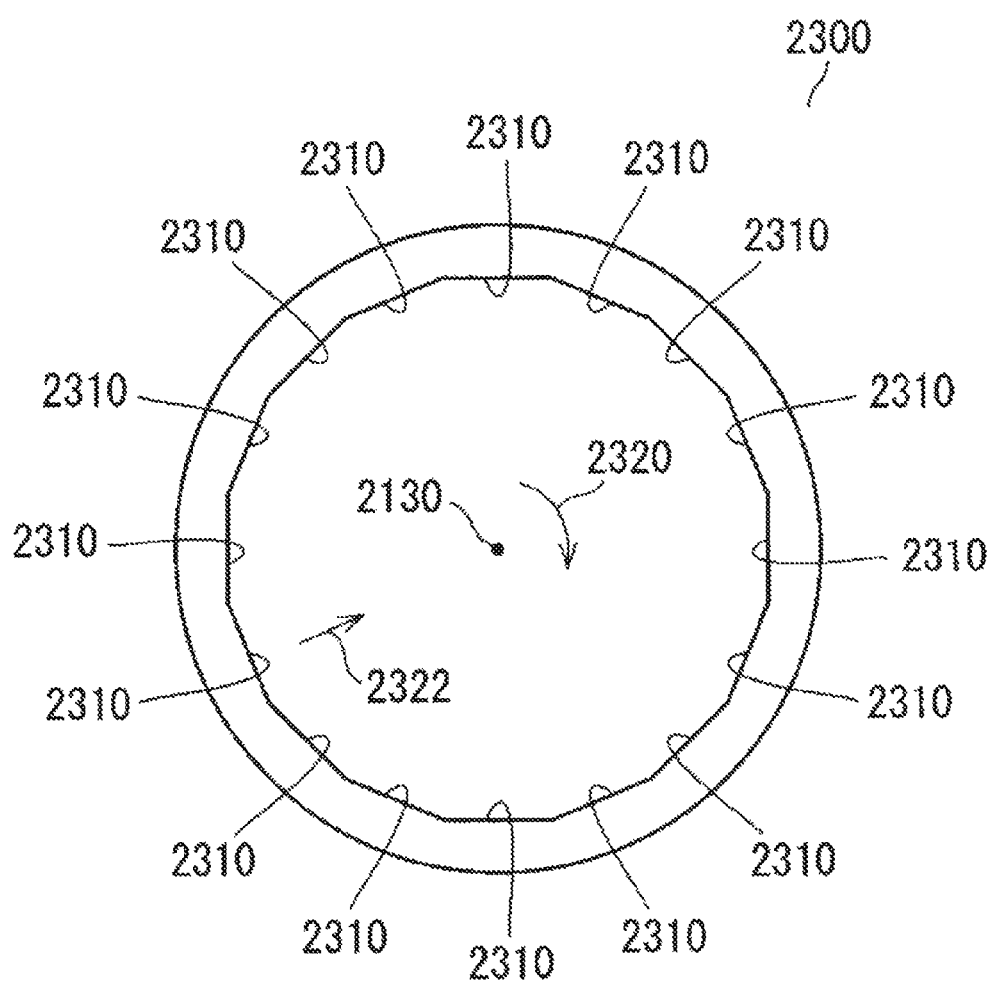
FIG. 9 is a top view of a polyhedral mirror.

The top view of FIG. 9 schematically illustrates a polyhedral mirror.

As illustrated in FIG. 9, the polyhedral mirror 2300 includes sixteen plane reflection surfaces 2310. The number of the plane reflection surfaces 2310 may be increased/decreased. When a direction ground around the reference axis 2130 is a circumferential direction 2320, and a direction approaching the reference axis 2130 is an inward direction 2322 in a radial direction, the sixteen plane reflection surfaces 2310 are dispersed and arrayed in the circumferential direction 2320 around the reference axis 2130, and faces the inward direction 2322 in the radial direction.

The first light beam 2100 is guided to the object to be illuminated 2120 through the annular slits 2140 and the inner circumferential reflection surfaces 2160 from the light-emitting diode 2020, and becomes illumination light. The first light beam 2100 is reflected by the inner circumferential reflection surfaces 2160. The second light beam 2101 is directly guided to the photodiodes 2021.

The first light beam 2100 is away from the reference axis 2130 while proceeding in the direction into which the reference axis 2130 extends, in a section from the photodiodes 2021 to the inner circumferential reflection surfaces 2160. The first light beam 2100 approaches the reference axis 2130 while proceeding in the direction into which the reference axis 2130 extends, in a section from the inner circumferential reflection surface 2160 to the object to be illuminated 2120, and converges on the object to be illuminated 2120. Accordingly, the object to be illuminated 2120 is illuminated from various azimuth angles. The object to be illuminated 2120 is uniformly illuminated, and an influence of the distance from the illumination device 2000 to the object to be illuminated 2120 becomes small.

The light-emitting diode 2020, the photodiodes 2021, the shielding plate 2022, and the cylindrical mirrors 2023 are supported by the housing 2024 in positions and postures that allow the first light beam 2100 and the second light beam 2101 to be guided in an aforementioned manner. The light-emitting diode 2020 is fixed to an inner surface 2180 of the lid object 2061. The photodiodes 2021 are fixed to an inner circumferential surface 2190 of the cylindrical object 2060 through the shielding plate 2022. The shielding plate 2022 and the cylindrical mirrors 2023 are fixed to the inner circumferential surface 2190 of the cylindrical object 2060. One end 2200 of the cylindrical object 2060 is blocked with the lid object 2061. The other end 2201 of the cylindrical object 2060 is released, and serves as an emission port of the illumination light. The light-emitting diode 2020, the photodiodes 2021, the shielding plate 2022, and the cylindrical mirrors 2023 are housed inside the housing 2024. The housing 2024 may be replaced with a support structure having another structure.

Figure 10:
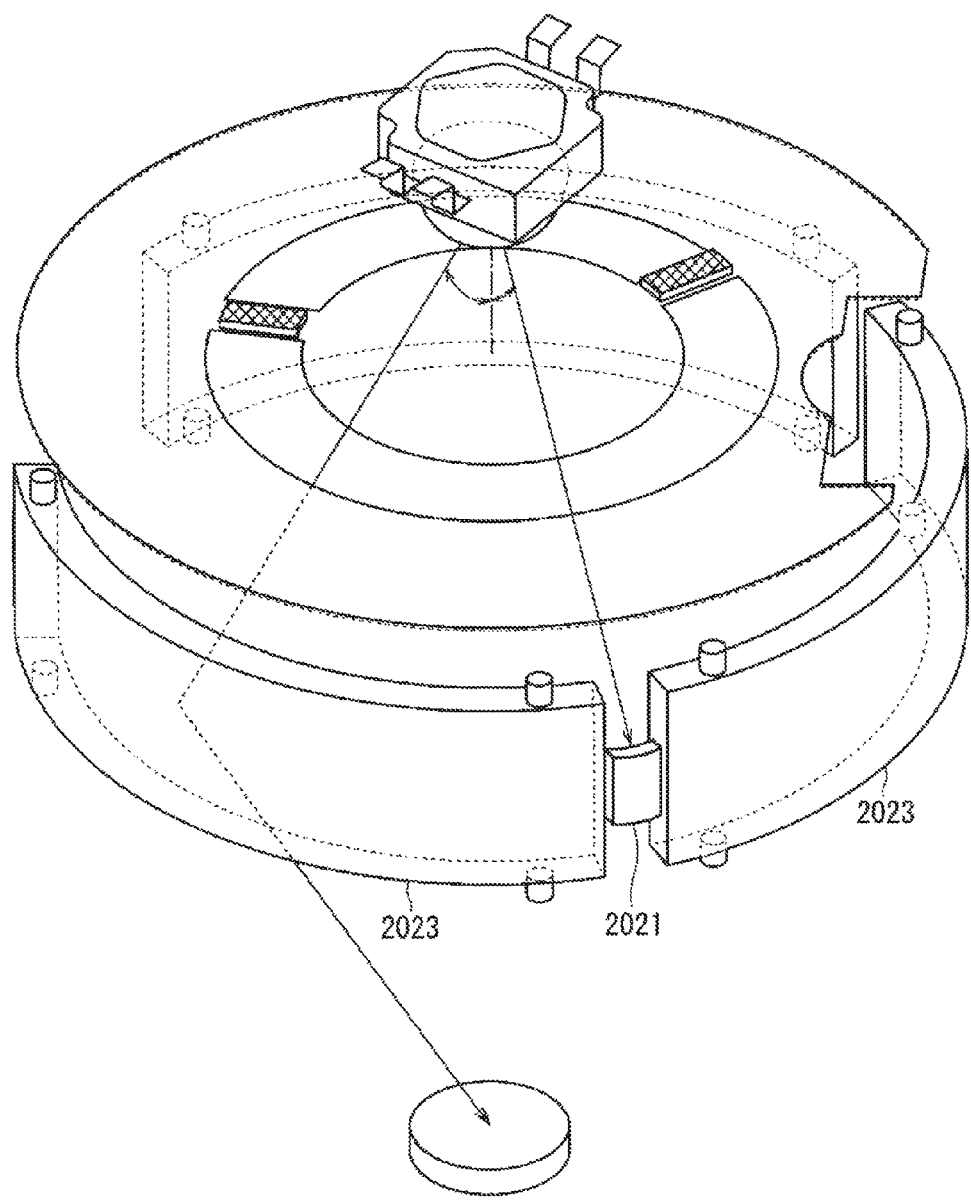
FIG. 10 is a perspective view of another arrangement of the light-emitting diode and the like in the second embodiment.

The light-emitting diode 2020 and the photodiodes 2021 are arranged above the shielding plate 2022. The cylindrical mirrors 2023 and the object to be illuminated 2120 are arranged below the shielding plate 2022. The "above" may be "above" in a vertical direction, or may not be "above" in the vertical direction. All or a part of the photodiodes 2021 may be moved below the shielding plate 2022. For example, as illustrated in FIG. 10, one photodiode 2021 may be moved to a gap between the adjacent cylindrical mirrors 2023. In this case, a part of the communication pieces 2042 is omitted so that the second light beam 2101 is not shielded by the communication piece 2042, that is, the second light beam 2101 can be guided to the photodiode 2021 through the annular slit 2140 from the light-emitting diode 2020.

Upper surfaces 2220 of the communication pieces 2042 exist at the side of the light-emitting diode 2020. The photodiodes 2021 are connected to the upper surfaces 2220 of the communication pieces 2042. Accordingly, the intensity of the light beam that proceeds toward the communication pieces 2042 necessary for integrating the inner circumferential-side plate 2040 and the outer circumferential-side plate 2041, that is, the intensity of the light beam that cannot be used as the illumination light is detected by the photodiodes 2021. The light 2080 emitted by the light-emitting diode 2020 can be efficiently used.

Although the structure of the illumination device 2000 becomes complicated, the photodiodes 2021 may not be connected to the upper surfaces 2220 of the communication pieces 2042. For example, it is allowed that the photodiodes 2021 are connected to an inner surface 2180 of the lid object 2061, the mirrors are connected to the upper surfaces 2220 of the communication pieces 2042, and the second light beam 2101 is guided to the photodiodes 2021 form the light-emitting diode 2020 through the mirrors.

Third Embodiment

A third embodiment relates to a multiangle colorimeter.

Figure 11:
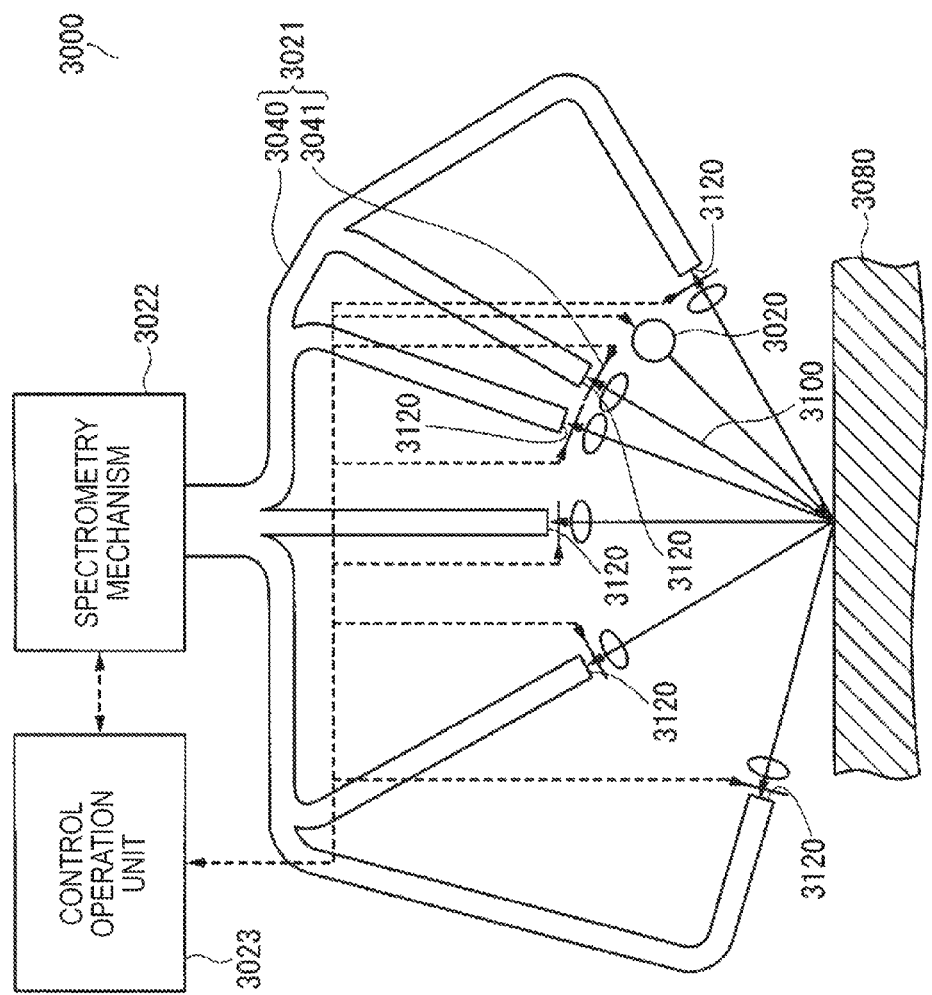
FIG. 11 is a block diagram of a multiangle colorimeter.
Figure 12:
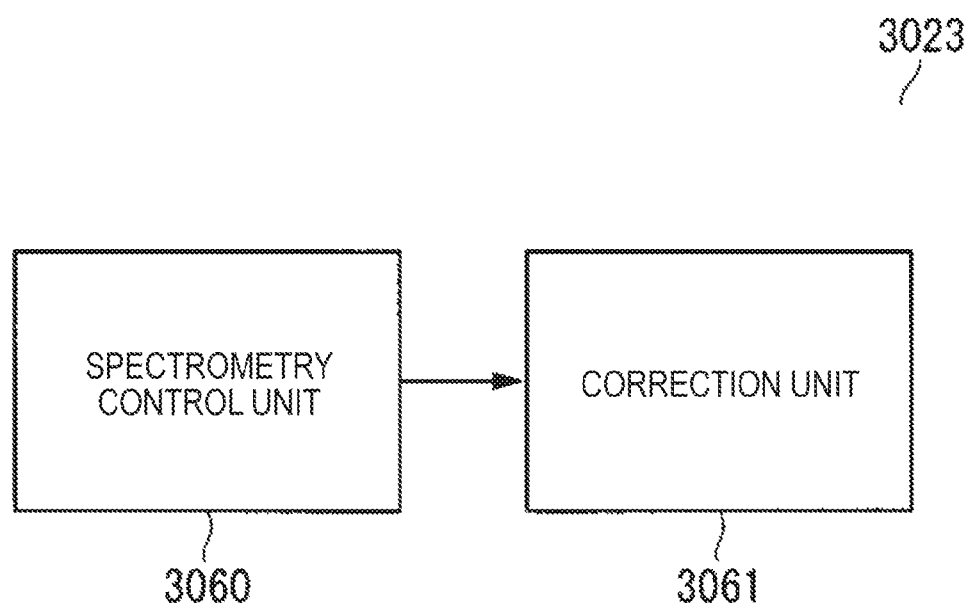
FIG. 12 is a block diagram of a control operation unit.

The block diagram of FIG. 11 schematically illustrates a multiangle colorimeter 3000 of the third embodiment. The block diagram of FIG. 12 schematically illustrates a control operation unit 3023.

The multiangle colorimeter 3000 is a unidirectional illumination/multidirectional light-receiving type colorimeter. In the unidirectional illumination/multidirectional light-receiving type colorimeter, illumination is performed from one direction, reflection light from the object to be illuminated into multi directions is received, and the received reflection light is subjected to spectrometry.

The multiangle colorimeter 3000 may be replaced with another type of reflection characteristic measuring device. For example, the multiangle colorimeter 3000 may be replaced with a multidirectional illumination/unidirectional light-receiving type colorimeter, a normal colorimeter, or the like. In the multidirectional illumination/unidirectional light-receiving type colorimeter, the illumination is performed from multi directions, the reflection light from the object to be illuminated into one directional is received, and the received reflection light is subjected to spectrometry. In the normal colorimeter, illumination is performed from one direction, the reflection light from the object to be illuminated into one directional is received, and the received reflection light is subjected to spectrometry.

As illustrated in FIG. 11, the multiangle colorimeter 3000 includes an illumination mechanism 3020, a light-receiving mechanism 3021, a spectrometry mechanism 3022, and a control operation unit 3023. The light-receiving mechanism 3021 includes a bundled fiber 3040 and a shutter 3041. As illustrated in FIG. 12, the control operation unit 3023 includes a spectrometry control unit 3060 and a correction unit 3061.

The illumination mechanism 3020 includes the illumination device 1000 of the first embodiment. The illumination device 1000 of the first embodiment may be replaced with the illumination device 2000 of the second embodiment.

The light-receiving mechanism 3021 receives reflection light 3100 from an object to be illuminated 3080 with a plurality of light-receiving angles (against normal angles), and guides the reflection light 3100 to the spectrometry mechanism 3022. The light-receiving mechanism 3021 may be omitted, and the reflection light 3100 from the object to be illuminated 3080 may be directly guided to the spectrometry mechanism 3022. The number of light-receiving angles may be increased/decreased.

The spectrometry mechanism 3022 performs spectrometry for the guided reflection light 3100. When the spectrometry is performed, the reflection light 3100 is dispersed by a wavelength dispersion element such as diffraction grating or a prism, change of the intensity of the light with a wavelength is detected by a sensor array or the like, and an optical spectrum is obtained. The system of the spectrometry may be changed.

The control operation unit 3023 controls the illumination mechanism 3020, the light-receiving mechanism 3021, and the spectrometry mechanism 3022, and performs an operation for a measurement result. The function of the control operation unit 3023 is realized by causing a built-in computer to execute a control program. Whole or apart of the function of the control operation unit 3023 may be realized by hardware that does not execute a program. The hardware is, for example, an electronic circuit that includes an operation amplifier, a comparator, a logic circuit, and the like.

The spectrometry control unit 3060 controls the illumination mechanism 3020, the light-receiving mechanism 3021, and the spectrometry mechanism 3022. The spectrometry control unit 3060 controls the illumination mechanism 3020 to illuminate the object to be illuminated 3080. Further, the spectrometry control unit 3060 controls the shutter 3041 to open an incident port 3120 of the light-receiving angle where measurement is performed, of a plurality of incident ports 3120 of the bundled fiber 3040, and close the residual incident ports 3120. Further, the spectrometry control unit 3060 controls the spectrometry mechanism 3022 to cause the spectrometry mechanism 3022 to perform spectrometry, and acquires a measurement result from the spectrometry mechanism 3022. Further, the spectrometry control unit 3060 acquires detection results of the photodiodes 1021 when the spectrometry is performed. The spectrometry control unit 3060 performs these measurement control processes for all of the light-receiving angles.

The correction unit 3061 corrects the measurement result of the spectrometry mechanism 3022, using the detection results of the photodiode 1021. In this correction, an influence of temporal change of the intensity of the illumination light (first light beam) is resolved. For example, the intensity of the detected second light beam is I, and a reference value of the intensity of the second light beam is I0, the intensity of the light in a result of the spectrometry is multiplied by I0/I. Accordingly, the intensity of the light in the result of the spectrometry is standardized, and the spectrometry is correctly performed.

Further, according to this correction, the spectrometry can be performed without waiting until the intensity of the illumination light is stabilized. Therefore, a time required for spectrometry can be reduced. This advantage becomes especially remarkable in a unidirectional illumination/multidirectional light-receiving type multiangle colorimeter 3000 in which the spectrometry needs to be repeated for a large number of light-receiving angles. In other words, the unidirectional illumination/multidirectional light-receiving type multiangle colorimeter 3000 that needs to repeat the spectrometry for the large number of light-receiving angles is easily subject to variation of the intensity of the illumination light. Therefore, the advantage of this correction, which reduces the influence of the intensity of the illumination light, becomes especially remarkable.

Fourth Embodiment

A fourth embodiment relates to a light-emitting diode unit in which the light-emitting diode that configures the illumination mechanism of the third embodiment is replaced.

Figure 13:
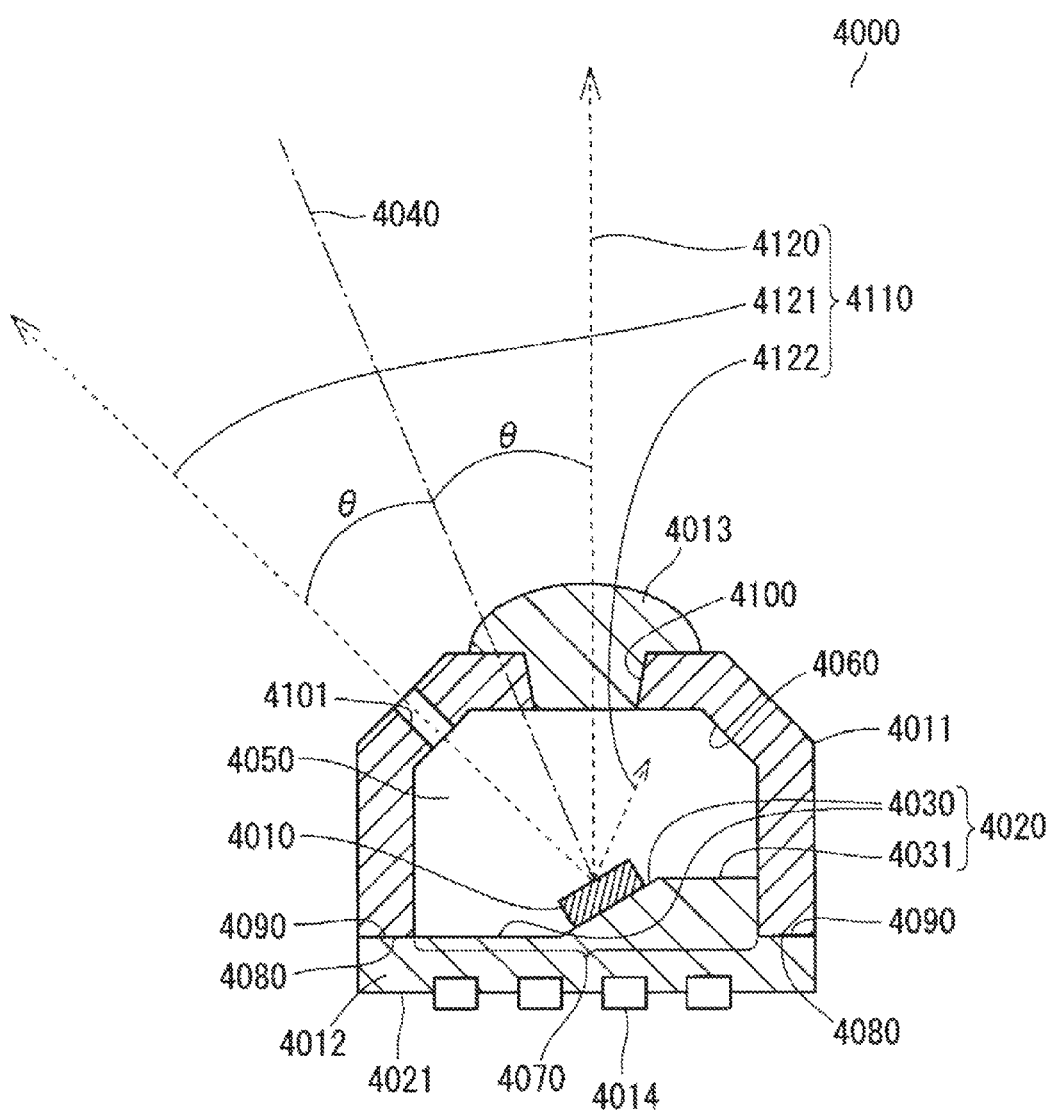
FIG. 13 is a sectional view of a light-emitting diode unit of a fourth embodiment.

The sectional view of FIG. 13 schematically illustrates a light-emitting diode unit 4000 of the fourth embodiment.

As illustrated in FIG. 13, the light-emitting diode unit 4000 includes a light-emitting diode 4010, an exterior 4011, a substrate 4012, a lens 4013, and an electrode 4014.

The light-emitting diode 4010 is mounted on an inclined region 4030 of one principal plane 4020 of the substrate 4012. The inclined region 4030 is inclined by an angle $\theta$ with respect to a flat region 4031 of the one principal plane 4020 of the substrate 4012. Therefore, a reference axis 4040 of the light-emitting diode 4010 extends in a direction making the angle $\theta$ with a direction into which a normal line of the flat region 4031 extends. A power feed electrode of the light-emitting diode 4010 is electrically connected with a wiring pattern exposed on the inclined region 4030. Light distribution of the light-emitting diode 4010 is axially symmetrical light distribution where the reference axis 4040 serves as an axis of symmetry. The light-emitting diode 4010 desirably has vertical light distribution characteristics in accordance with the Lambert's cosine law.

The exterior 4011 is mounted on one principal plane 4020 of the substrate 4012. In the exterior 4011, a space 4050 is formed. The space 4050 is defined by an inner surface 4060 of the exterior 4011, and is exposed to an outside of the exterior 4011 in an opening 4070 of the exterior 4011. An end surface 4080 of the exterior 4011 along an outer circumference of the opening 4070 is fixed to a region to be fixed 4090 of the one principal plane 4020 of the substrate 4012 that surrounds the light-emitting diode 4010. Accordingly, the opening 4070 is blocked with the one principal plane 4020 of the substrate 4012, and the light-emitting diode 4010 is arranged in the space 4050 surrounded by the inner surface 4060 and the one principal plane 4020 of the substrate 4012.

A hole 4100 and a hole 4101 are formed in the exterior 4011. Each of the hole 4100 and the hole 4101 communicates the space 4050 and the outside of the exterior 4011. The hole 4100 exists in a direction making the angle $\theta$ with the reference axis 4040 as viewed from the light-emitting diode 4010. The hole 4101 exists in a direction making the angle $\theta$ with respect to the reference axis 4040 as viewed from the light-emitting diode 4010. The hole 4101 exists at an opposite side to the hole 4100 with respect to the reference axis 4040.

The exterior 4011 has a light shielding property. The exterior 4011 is desirably a resin molded body, and is more desirably integrally molded. Processing of decreasing reflectance is desirably applied to the inner surface 4060. When the processing of decreasing the reflectance is applied to the inner surface 4060, the stray light is suppressed.

The hole 4100 is blocked with the lens 4013.

The electrode 4014 is provided on the other principal plane 4021 of the substrate 4012. The electrode 4014 is electrically connected to the power feed electrode of the light-emitting diode 4010 through a wiring pattern. Accordingly, the power supplied to the electrode 4014 is fed to the power feed electrode of the light-emitting diode 4010 through the wiring pattern. When the power is fed to the power feed electrode of the light-emitting diode 4010, the light-emitting diode 4010 emits light 4110.

The light 4110 is formed of a first light beam 4120, a second light beam 4121, and a residual light beam 4122. The first light beam 4120 is guided to the object to be illuminated through the hole 4100 and the lens 4013, and becomes illumination light. The first light beam 4120 is condensed by the lens 4013. The second light beam 4121 is guided to a photodiode 1021 through the hole 4101. The residual light beam 4122 is shielded by the exterior 4011. The first light beam 4120 proceeds to a direction making the angle θ with the reference axis 4040. The second light beam 4121 proceeds in a direction making the angle θ with the reference axis 4040. A traveling direction of the first light beam 4120 exists at an opposite side to the second light beam 4121 with respect to the reference axis 4040.

Figure 14:
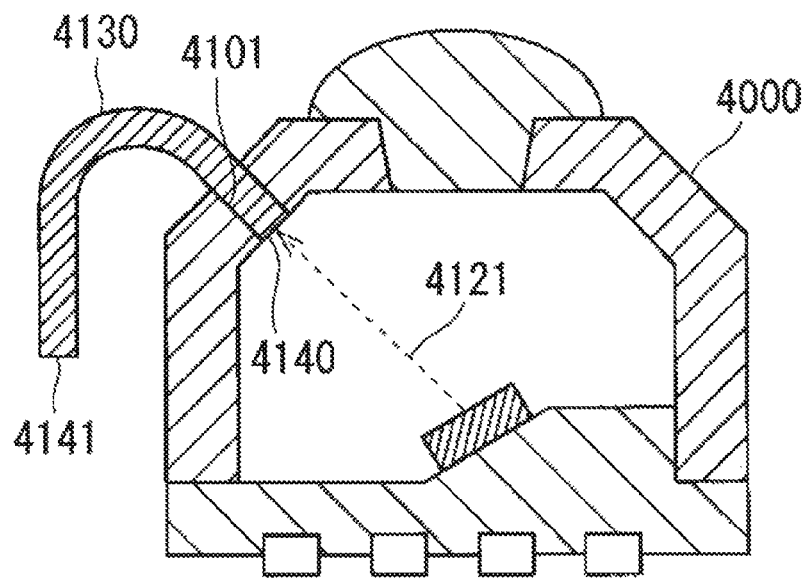
FIG. 14 is a sectional view of the light-emitting diode unit and the like of the fourth embodiment.
Figure 15:
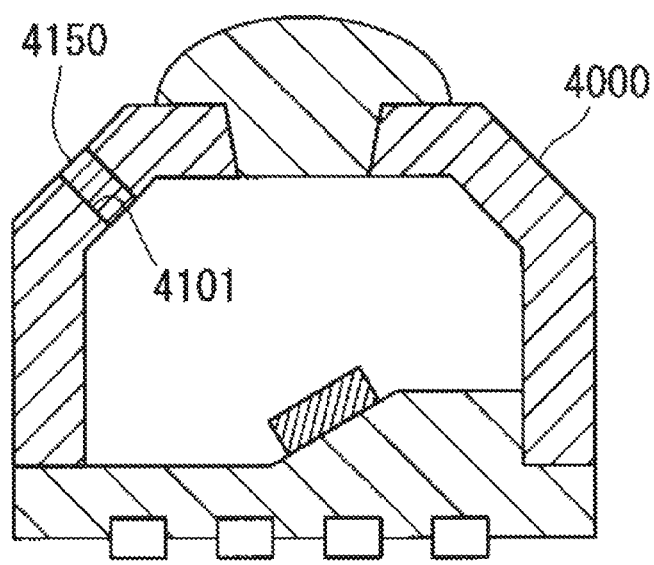
FIG. 15 is a sectional view of the light-emitting diode and the like of the fourth embodiment.

When the light-emitting diode unit 4000 illustrated in FIG. 13 is employed, the second light beam 4121 may be guided through the hole 4101 to the photodiode 1021 with the optical fiber 4130, as illustrated in FIG. 14. In this case, an incident end 4140 of the optical fiber 4130 is connected to the hole 4101, and the photodiode 1021 is arranged to an emission end 4141 of the optical fiber 4130. As illustrated in FIG. 15, a photodiode 4150 in place of the photodiode 1021 may be arranged in the hole 4101.

Although the present invention has been illustrated and described in detail, the above description is exemplarily described and is not restrictive in all aspects. Therefore, it is understood that numerous revisions and modifications can be made without departing from the scope of the present invention.

REFERENCE SIGNS LIST

1000 Illumination device
1020 Light-emitting diode
1021 Photodiode
1022 Support structure
2000 Illumination device
2020 Light-emitting diode
2021 Photodiode
2022 Shielding plate
2023 Cylindrical mirror
2024 Housing
2040 Inner circumferential-side plate
2041 Outer circumferential-side plate
2042 Communication piece
2300 Polyhedral mirror
4010 Light-emitting diode
4011 Exterior
4150 Photodiode

The invention claimed is:

1. An illumination device comprising:
a light source configured to emit light, having a reference axis, and having light distribution in which the reference axis serves as an axis of symmetry or light distribution in which a plane including the reference axis serves as a plane of symmetry, the light including a first light beam and a second light beam, a traveling direction of the first light beam making a first angle with the reference axis, a traveling direction of the second light beam making a second angle with the reference axis, and the second angle being the same as the first angle;
a photodetector configured to detect intensity of the second light beam; and
a support structure configured to support the light source and the photodetector in positions and postures that allow the first light beam to be guided to an object to be illuminated, and the second light beam to be guided to the photodetector.

2. The illumination device according to claim 1, further comprising:
a shield in which a hole is formed, wherein
the support structure supports the shield in a position and a posture that allow the first light beam to be guided to the object to be illuminated through the hole from the light source.

3. The illumination device according to claim 2, further comprising:
an optical system, wherein
the shield is a shielding plate, and the hole is an annular slit, and
the support structure supports the optical system in a position and a posture that allow the first light beam to be guided to the object to be illuminated through the annular slit and the optical system from the light source.

4. The illumination device according to claim 3, wherein the optical system includes a cylindrical mirror including an inner circumferential reflection surface that reflects the first light beam.

5. The illumination device according to claim 3, wherein the optical system includes a reflection mechanism including a plurality of plane reflection surfaces that reflects the first light beam.

6. The illumination device according to claim 3, wherein the shielding plate includes
an inner circumferential-side plate existing at an inner circumferential side of the annular slit,
an outer circumferential-side plate existing at an outer circumferential side of the annular slit, and
a communication piece that communicates the inner circumferential-side plate and the outer circumferential-side plate, and including a principal plane existing at a side of the light source, the photodetector being connected to the principal plane.

7. A reflection characteristic measuring device comprising:
the illumination device according to claim 1;
a spectrometry mechanism configured to perform spectrometry of reflection light from the object to be illuminated; and
a correction unit configured to perform correction for a measurement result of the spectrometry mechanism, the correction resolving an influence of temporal variation of intensity of the first light beam, using a detection result of the photodetector.

8. A reflection characteristic measuring device comprising:
the illumination device according to claim 2;
a spectrometry mechanism configured to perform spectrometry of reflection light from the object to be illuminated; and
a correction unit configured to perform correction for a measurement result of the spectrometry mechanism, the correction resolving an influence of temporal variation of intensity of the first light beam, using a detection result of the photodetector.

9. A reflection characteristic measuring device comprising:
the illumination device according to claim 3;
a spectrometry mechanism configured to perform spectrometry of reflection light from the object to be illuminated; and
a correction unit configured to perform correction for a measurement result of the spectrometry mechanism, the correction resolving an influence of temporal variation of intensity of the first light beam, using a detection result of the photodetector.

10. The illumination device according to claim 4, wherein the shielding plate includes
an inner circumferential-side plate existing at an inner circumferential side of the annular slit,
an outer circumferential-side plate existing at an outer circumferential side of the annular slit, and
a communication piece that communicates the inner circumferential-side plate and the outer circumferential-side plate, and including a principal plane existing at a side of the light source, the photodetector being connected to the principal plane.

11. A reflection characteristic measuring device comprising:
the illumination device according to claim 4;
a spectrometry mechanism configured to perform spectrometry of reflection light from the object to be illuminated; and
a correction unit configured to perform correction for a measurement result of the spectrometry mechanism, the correction resolving an influence of temporal variation of intensity of the first light beam, using a detection result of the photodetector.

12. The illumination device according to claim 5, wherein the shielding plate includes
an inner circumferential-side plate existing at an inner circumferential side of the annular slit,
an outer circumferential-side plate existing at an outer circumferential side of the annular slit, and
a communication piece that communicates the inner circumferential-side plate and the outer circumferential-side plate, and including a principal plane existing at a side of the light source, the photodetector being connected to the principal plane.

13. A reflection characteristic measuring device comprising:
the illumination device according to claim 5;
a spectrometry mechanism configured to perform spectrometry of reflection light from the object to be illuminated; and
a correction unit configured to perform correction for a measurement result of the spectrometry mechanism, the correction resolving an influence of temporal variation of intensity of the first light beam, using a detection result of the photodetector.

14. A reflection characteristic measuring device comprising:
the illumination device according to claim 6;
a spectrometry mechanism configured to perform spectrometry of reflection light from the object to be illuminated; and
a correction unit configured to perform correction for a measurement result of the spectrometry mechanism, the correction resolving an influence of temporal variation of intensity of the first light beam, using a detection result of the photodetector.

* * * * *